FILM FOR USE IN TELEVISING PICTURES

Filed June 8, 1954 2 Sheets-Sheet 1

Inventor:
HORST ZSCHAU
BY:
Michael S. Striker
Agt

FILM FOR USE IN TELEVISING PICTURES

Filed June 8, 1954 2 Sheets-Sheet 2

Inventor:
HORST ZSCHAU
BY:
Michael S. Striker
Agt

United States Patent Office 3,004,467
Patented Oct. 17, 1961

3,004,467

FILM FOR USE IN TELEVISING PICTURES

Horst Zschau, Darmstadt, Germany, assignor to Firma Fernseh G.m.b.H., Darmstadt, Germany Filed June 8, 1954, Ser. No. 435,235
Claims priority, application Germany June 9, 1953
2 Claims. (Cl. 88—16.2)

This invention relates to a method and apparatus for televising pictures and automatically controlling the amplification of television signals so as to improve the reproduction of the pictures.

In the transmission of pictures and particularly moving picture films by television it is usually not possible to use a normal copy of a film, since the density or blackness of such film is too great. What is needed is a film which is flat, i.e. has a small range of densities, since a considerable increase in gradation results from the reproduction characteristic of the television picture tube. Television picture tubes are characterized by gamma values of 1.8 to 2. A contrast range of 1 to 10 is amplified by gamma equals 2 to a range of 1 to a 100, while a range of 1 to 100 is amplified to 1 to 10000. A picture tube cannot reproduce such ranges of contrast and consequently a great deal of the detail of the picture is lost in reproduction.

For this reason it has been the practice to make special copies of moving picture films having density ranges considerably less than the theater copies of the films. The production of such special copies is expensive and requires much time, and also presumes that the negative is available and the legal right of reproduction has been cleared. Furthermore, in the production of the special copies one does not always succeed in maintaining the correct sensitometric values.

It has been the practice, therefore, to use so-called gamma control. For this purpose adjustments are made in the amplifying channel at the sending and corresponding to gamma values of 1 to 0.5. Theoretically, in a film scanner, a gamma value of 0.5 to 0.6 ought to suffice for the satisfactory reproduction of all films. However, changes in the transmission channel and unsatisfactory qualities of film copies require that the gamma values be set for each particular scene. This is done, for example, by watching the picture continuously and setting the desired gamma value by means of a dial as the film proceeds. This method has the disadvantage that only very well trained and attentive personnel can be employed. This method also has the further disadvantages that poor settings are unavoidable and that a certain time elapses, due to the reaction time of the operator or monitor, before the correct setting can be made. These adjustments must be made during transmission and, therefore, are visible at the receiver.

It is an object of the present invention to provide a method and apparatus for automatically controlling the gamma of television signals at the sending end of a television system and thereby overcome the prior art disadvantages and defects described above.

According to the invention there is provided for the transmission of pictures by television a picture record or a moving picture film strip having markings at places thereon not used for the picture. These markings correspond to a characteristic of the pictures, such as the contrast or density of the pictures. Means are provided for deriving control signals from these markings. A transmission channel for the television signals is then controlled so that its amplification varies in accordance with said control signals.

More particularly, according to the invention a moving picture film strip is provided with a magnetic sound track along one edge thereof and a second modulated magnetic track along its other edge. A cathode ray tube scanner projects a light beam through the film onto a photo-electric tube. The second magnetic track is scanned by a magnetic pick-up which derives control signals from said second magnetic track. The video signals from the output of the photo-electric tube are fed in parallel to a pair of amplifiers having different characteristic curves. The gain of at least one of these amplifiers is controlled by the control signals so that their combined outputs cause the gamma of the video signals to vary in a desired manner.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings, in which:

Figure 1:
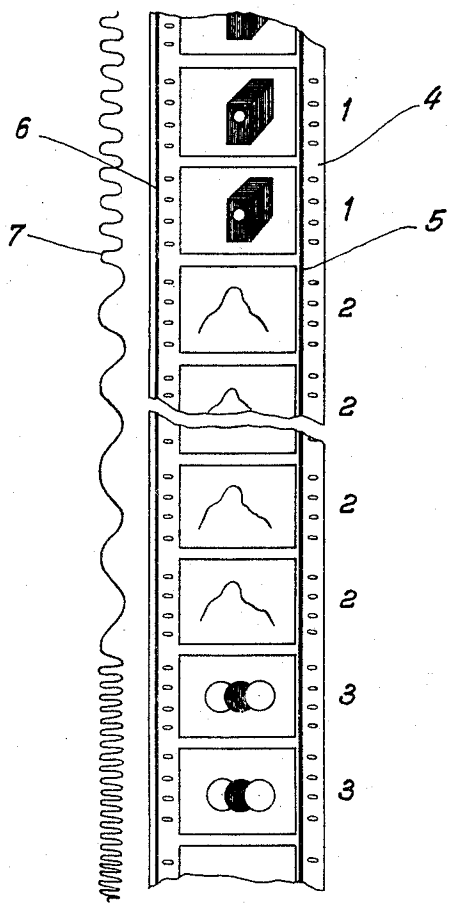
FIG. 1 is an illustration of a film strip and a diagrammatic indication of the modulation on one magnetic track thereof.

Referring now to FIG. 1 there is shown a picture record in the form of a film strip 4. Strip 4 contains a plurality of picture frames and a magnetic track 5 on which the sound signal is recorded. To insure even winding of the film strip 4 a second magnetic track 6 is placed on the opposite edge of the film strip. According to the invention a signal is modulated on the otherwise unused track 6. The modulation signal on track 6 is represented schematically by the curve 7 and shows a frequency change from the time of transmission of scene 1 to scene 2 and also from scene 2 to scene 3. The modulating signal 7 may exist for the duration of the entire scene or only at the beginning of each scene. In the latter case suitable means are provided to maintain the voltage represented by a given signal at a substantially constant value until the next signal occurs.

Figure 2:
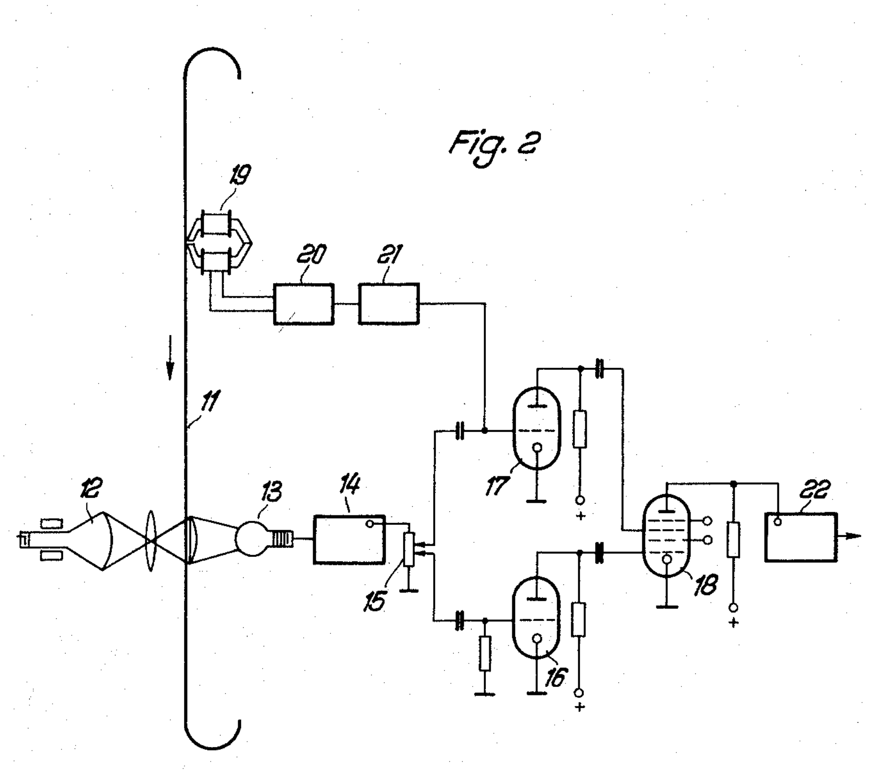
FIG. 2 is a schematic diagram of one embodiment of the invention.

Referring to FIG. 2, the film strip 4 is scanned by a cathode ray tube 12. The light beam from the cathode ray tube 12 is projected through the film 4 onto a photo-electric tube 13, preferably of the type having secondary emission current multipliers. From the output of the photo tube 13 voltages corresponding to the brightness of the individual picture points are fed to an amplifier 14. A device such as a potentiometer 15 for tapping off different portions of the output of amplifier 14 is coupled to the control grids 16*a* and 17*a* of amplifiers 16 and 17 through condensers 16*b* and 17*b*. The outputs of amplifiers 16 and 17 are fed through coupling condensers 16*c* and 17*c* to the control grids 18*a* and 18*b* of an amplifier 18 which is in turn connected to suitable output circuits 22. For the sake of simplicity biasing circuits and other circuit details not essential to an understanding of the invention are omitted.

In order to obtain the control signals from the film strip 4 a magnetic pick-up head 19 is provided. The magnetic pick-up 19 is connected to a frequency discriminator 20, the output of which is a varying voltage corresponding to the modulation 7 on the magnetic track 6. The output of the discriminator is amplified by a variable gain amplifier 21 and then fed to the control grid 17*a* of amplifier 17 to vary the bias on said grid. If the control signals are recorded so that they occur only at the beginning of each picture or scene amplifier 21 may be arranged to hold the voltage produced by each control signal at a substantially constant value until the next signal occurs.

The amplifiers 16 and 17 preferably have different operating curves, consequently the signals are differently amplified by these two amplifiers. By adjusting the ratio of the amplitudes of the video signals fed to the grids 16*a* and 17*a*, which adjustment can be made by shifting the taps on potentiometer 15, any desired composite operating curve and, thereby, any desired gamma can be established. The gamma value thus set in, once a given adjustment has been made, can be changed only by changing the bias on the grid 17*a*. Accordingly, a variation of gamma is produced corresponding to the modulation 7. The modulation 7 may have a magnitude such that the maximum amplitude of the television signals is held at some constant value regardless of the contrast range of the picture.

It is possible to control the gamma also by other means, as, for example, by a feedback connection to the scanning tube to control the intensity of the scanning beam.

The present invention is useful also in the field of color television. In the scanning of color pictures the separate color signals are not reproduced with an amplitude such that a true picture of the original is produced in the receiver. In order to regulate the amplification of the color signals to the desired value, in accordance with the invention, special markings can be made which influence the amplification of the various color channels differently, each of which color channels may be similar to the apparatus shown in FIG. 2. In addition to the differential control of the amplification of the color channels the gamma value of each channel can be adjusted to yield a gamma value of 1 for the entire transmission system, including the reproduction apparatus.

By using a different kind of markings, the amplitude range of the amplifier may be regulated by electrical switching means to control the gamma. This type of control is of advantage where the film consists of several strips and it is desired to get better gradation of the dark places in one strip and in the light places in another strip.

Figure 3:
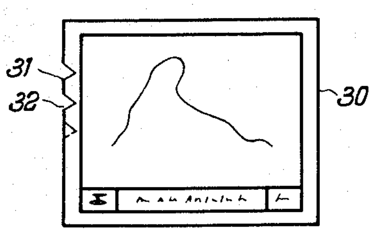
FIG. 3 is a showing of a picture record having another type of control markings.

Referring to FIG. 3 there is shown another picture record according to the invention wherein the border of the picture 30 is provided with triangular notches 31 and 32. These notches may, either by their depth of their number, represent the change in the value of gamma which it is desired to introduce in the video signals. It will be apparent that the notches may be sensed by any suitable known means such as contact levers adapted to produce voltage variations. It will be apparent that the control signal markings can be of many other forms, such as holes, metal markers, opaque marks etc. and can be scanned mechanically, optically, or pneumatically as well as magnetically.

It will be understood that each of the elements described above, or two or more together, may also find a useful application in other types of television scanning systems differing from the types described above.

While the invention has been illustrated and described as embodied in a film scanning television system having automatic gamma control of the video signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A motion picture film strip adapted to be televised and having a central portion containing a longitudinally extending series of picture frames, and first and second edge portions extending along said central portion on either side thereof, respectively; a record strip means formed by a first magnetizable layer of material applied to the film strip alongside said series of picture frames within said first edge portion and carrying a magnetic sound record; and spacer strip means applied to the film alongside said series of picture frames within said second edge portion as a second layer having substantially the same thickness as said first magnetizable layer for insuring even winding of the film in view of the presence of said record strip means, said spacer strip means additionally comprising magnetizable material and carrying magnetically recorded substantially continuous signals of varying significance respectively corresponding in various portions of said spacer strip means to varying density values of the pictures in picture frames located on said film strip in a predetermined relation to the respective portions of said spacer strip means.

2. A motion picture film strip adapted to be televised and having a central portion containing a longitudinally extending series of picture frames, and first and second edge portions extending along said central portion on either side thereof, respectively; a record strip means formed by a first magnetizable layer of material applied to the film strip alongside said series of picture frames within said first edge portion and carrying a magnetic sound record; and spacer strip means applied to the film alongside said series of picture frames within said second edge portion as a second layer having substantially the same thickness as said first magnetizable layer for insuring even winding of the film in view of the presence of said record strip means, said spacer strip means additionally comprising magnetizable material and carrying magnetically recorded substantially continuous signals of varying significance respectively corresponding in various portions of said spacer strip means to varying density values of the pictures in pictures frames located on said film strip in a predetermined relation to the respective portions of said spacer strip means, said recorded signals consisting in recorded frequency modulations, various modulations representing respectively predetermined values of gamma which is desired to be applied to video signals during the transmission of the respective pictures.

References Cited in the file of this patent

UNITED STATES PATENTS

| | | |
|---|---|---|
| 1,787,825 | Jones | Jan. 6, 1931 |
| 1,832,097 | Chipman | Nov. 17, 1931 |
| 2,101,121 | Wixon | Dec. 7, 1937 |
| 2,188,679 | Dovaston | Jan. 30, 1940 |
| 2,243,047 | Foster et al. | May 20, 1941 |
| 2,526,516 | Supitilov | Oct. 17, 1950 |
| 2,628,288 | Blaney | Feb. 10, 1953 |
| 2,674,009 | Williams | Apr. 6, 1954 |
| 2,719,247 | Bedford | Sept. 27, 1955 |
| 2,826,112 | Mueller | Mar. 11, 1958 |

FOREIGN PATENTS

| | | |
|---|---|---|
| 319,659 | Great Britain | Nov. 27, 1930 |
| 631,095 | Great Britain | Oct. 27, 1949 |